United States Patent
Xiao

(10) Patent No.: US 10,325,198 B2
(45) Date of Patent: Jun. 18, 2019

(54) WEARABLE DEVICE

(71) Applicant: GIESECKE+DEVRIENT MOBILE SECURITY GMBH, München (DE)

(72) Inventor: Wei Xiao, Beijing (CN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/775,963

(22) PCT Filed: Nov. 11, 2016

(86) PCT No.: PCT/EP2016/001883
§ 371 (c)(1),
(2) Date: May 14, 2018

(87) PCT Pub. No.: WO2017/080666
PCT Pub. Date: May 18, 2017

(65) Prior Publication Data
US 2018/0330223 A1    Nov. 15, 2018

(30) Foreign Application Priority Data
Nov. 13, 2015  (CN) .......................... 2015 1 0777105

(51) Int. Cl.
*G06K 19/07*   (2006.01)
*G06K 19/077*  (2006.01)
*G06Q 20/32*   (2012.01)

(52) U.S. Cl.
CPC ....... *G06K 19/07762* (2013.01); *G06K 19/07* (2013.01); *G06K 19/0702* (2013.01); *G06Q 20/3278* (2013.01)

(58) Field of Classification Search
CPC ......... G06K 19/07762; G06K 19/0702; G06Q 20/3278
See application file for complete search history.

(56) References Cited

U.S. PATENT DOCUMENTS 8,730,012 B2 * 5/2014 Phillips ................. G06Q 20/20
                                                340/10.1
9,998,182 B2 * 6/2018 Huang ................. H04B 5/0081
(Continued)

FOREIGN PATENT DOCUMENTS

CN    103955823 A    7/2014
CN    104392352 A    3/2015
(Continued)

OTHER PUBLICATIONS

Chinese Office Action from CN Application No. 201510777105.2, dated Oct. 25, 2017.
(Continued)

*Primary Examiner* — Seung H Lee
(74) *Attorney, Agent, or Firm* — Workman Nydegger

(57) ABSTRACT

A wearable device having a main control chip, a switching circuit, a secure payment chip, a signal gain chip, an active coil and a passive coil. The main control chip receives a switching instruction and generates a control signal according to the switching instruction. The switching circuit generates a switching signal and controls the wearable device to be in an active coil working state or a passive coil working state. The secure payment chip executes a payment operation behavior according to an interactive terminal signal and generating a return signal. The active coil is used for transmitting the amplified return signal to an interactive terminal and transmitting the interactive terminal signal to the signal gain chip. The passive coil is used for transmitting the return signal to an interactive terminal when in the working state and transmitting the interactive terminal signal to the secure payment chip.

3 Claims, 1 Drawing Sheet

(56) References Cited

U.S. PATENT DOCUMENTS

| | | |
|---|---|---|
| 2007/0262849 A1 | 11/2007 | Ismail |
| 2009/0325488 A1 | 12/2009 | Seol et al. |
| 2015/0145671 A1 | 5/2015 | Cohen et al. |
| 2016/0171484 A1 | 6/2016 | Liu |
| 2016/0172890 A1* | 6/2016 | Jeong ............... H02J 7/04 320/108 |
| 2016/0187857 A1* | 6/2016 | Cho ............... G04R 20/00 368/47 |
| 2016/0249157 A1* | 8/2016 | Fine ............... H04W 4/80 |
| 2017/0270507 A1 | 9/2017 | Wang et al. |

FOREIGN PATENT DOCUMENTS

| | | |
|---|---|---|
| CN | 104517083 A | 4/2015 |
| CN | 104537531 A | 4/2015 |
| CN | 205145671 U | 4/2016 |

OTHER PUBLICATIONS

Chinese Office Action from CN Application No. 201510777105.2, dated May 10, 2018.
Chinese Search Report from CN Application No. 201510777105.2, dated Oct. 16, 2017.
International Preliminary Report on Patentability from PCT Application No. PCT/EP2016/001883, dated May 24, 2018.
International Search Report from PCT Application No. PCT/EP2016/001883, dated Jan. 31, 2017.

* cited by examiner

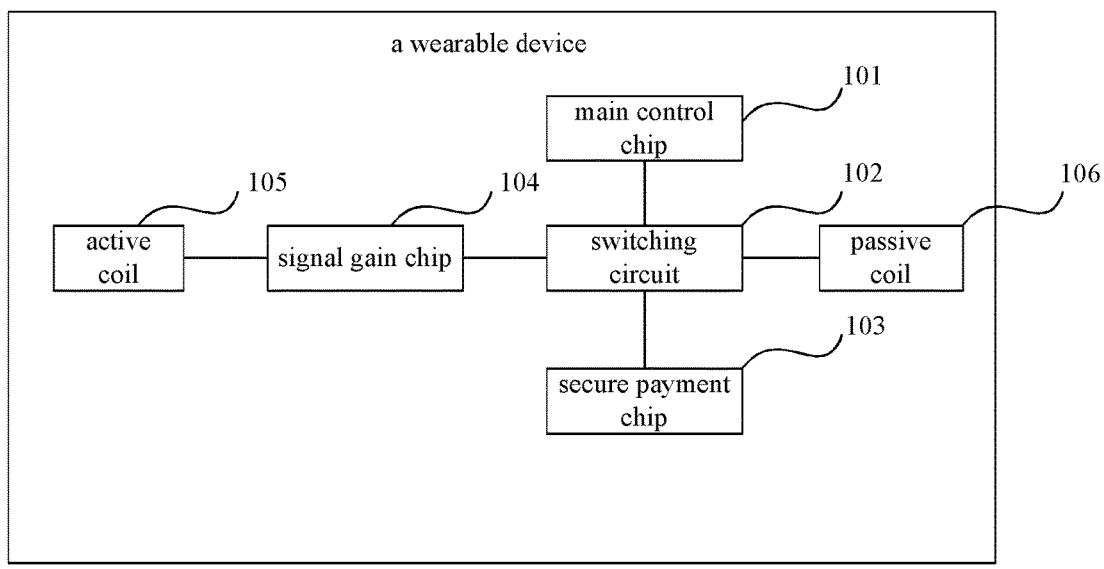

WEARABLE DEVICE

TECHNICAL FIELD

The present invention relates to the field of intelligent wearable technology, and in particular, to a wearable device.

BACKGROUND

Wearable devices current on the market generally support non-contact applications, such as bank applications and public transport applications, etc. Its antenna design mainly has two kinds, one is active antenna design and the other is passive antenna design. Among these two designs, each one has its own merits. The active antenna design is to add a signal gain chip between a secure payment chip and a coil to increase the distance of communication, which is beneficial to promotion in the field of public transport, however, the disadvantage is that the energy consumption is relatively high and it needs to be supported by the energy of battery. In respect of a wearable device, the battery capacity is very limited, which causes a short service cycle of the device. The passive antenna design is to directly connect the coil with the secure payment chip, and in a case where the battery is run out, energy may be obtained by coil coupling to work with it. Since there is no need for additional components, the power consumption is low and the device service cycle is long, however, the disadvantage is that the distance of communication is short and could not be used in some applications.

SUMMARY

In order to solve the problems of prior art, the present invention provides a wearable device, which combines the respective advantages of an active antenna and a passive antenna and makes up the short slab, and prolongs the service time of the product's battery.

In order to achieve the purpose above, the present invention provides a wearable device, comprising:

A main control chip, a switching circuit, a secure payment chip, a signal gain chip, an active coil and a passive coil; wherein, The main control chip is used for receiving a switching instruction and generating a control signal according to the switching instruction, wherein the control signal is input to the switching circuit;

The switching circuit is used for generating a switching signal according to the control signal and controlling the wearable device to be in an active coil working state or in a passive coil working state;

The secure payment chip is used for executing a payment operation behavior according to an interactive terminal signal and generating a return signal;

The signal gain chip is used for amplifying, receiving and transmitting the interactive terminal signal and the return signal when the wearable device is in the active coil working state;

The active coil is used for transmitting the amplified return signal to a interactive terminal and transmitting the interactive terminal signal to the signal gain chip;

The passive coil is used for transmitting the return signal to the interactive terminal when in the working state and transmitting the interactive terminal signal to the secure payment chip.

Preferably, the main control chip is also used for generating a control signal according to the battery level of the wearable device, wherein the control signal is input to the switching circuit.

Preferably, the switching instruction is issued from a mobile device.

The above technical solution has the following beneficial effects:

The present technical solution significantly improves the success rate of swiping card in non-contact applications of a wearable device, and prolongs the working time of the product's battery.

BRIEF DESCRIPTION OF THE DRAWINGS

In order to explain the technical solutions in the embodiments of the present invention or in the prior art more clearly, attached drawings to be used in the description of embodiments or prior art will be briefly introduced in the following. Apparently, the attached drawings described below are only some embodiments of the present invention. It is possible for those of ordinary skill in the art to obtain other attached drawings according to these attached drawings on the premise of paying no creative work.

FIG. 1 is a block diagram of a wearable device provided by the present invention.

DETAILED DESCRIPTION

The technical solutions in the embodiments of the present invention will be described clearly and completely below in conjunction with the attached drawings in the embodiments of the present invention. Apparently, the embodiments described are just part of embodiments of the present invention, rather than all of the embodiments. All the other embodiments obtained by those of ordinary skill in the art without paying creative work based on the embodiments of the present invention, belong to the scope of the present invention.

The working principle of the present technical solution: the present technical solution combines the two kinds of antenna designs, thus both active antenna design and passive antenna design are supported in the same wearable device, which may be switched freely according to the actual situation. When a relatively long distance of communication is needed, the active antenna is started, and in other cases, the passive antenna design is used. In this way, advantages of the two kinds of antennas are well combined, which not only prolongs the service time of the product's battery, but also increases the distance of communication. At the same time, a firmware of the wearable device automatically determines to switch from the active antenna to the passive antenna according to the situation of battery level. Here, the firmware is the program written into the EROM (erasable read-only memory) or EEPROM (electrically erasable programmable read-only memory).

Based on the working principle described above, the present invention provides a wearable device as shown in FIG. 1, comprising:

A main control chip 101, a switching circuit 102, a secure payment chip 103, a signal gain chip 104, an active coil 105 and a passive coil 106; wherein, The main control chip 101 is used for receiving a switching instruction and generating a control signal according to the switching instruction, wherein the control signal is input to the switching circuit 102; In addition to generating a control signal according to the switching instruction, the main control chip 101 may also generate a control signal according to the battery level of the wearable device, wherein the control signal is input to the switching circuit 102.

The switching circuit 102 is used for generating a switching signal according to the control signal and controlling the wearable device to be in an active coil working state or in a passive coil working state;

The secure payment chip 103 is used for executing a payment operation behavior according to an interactive terminal signal and generating a return signal;

The signal gain chip 104 is used for amplifying, receiving and transmitting the interactive terminal signal and the return signal when the wearable device is in the active coil working state;

The active coil 105 is used for transmitting the amplified return signal to a interactive terminal and transmitting the interactive terminal signal to the signal gain chip;

The passive coil 106 is used for transmitting the return signal to the interactive terminal when in the working state and transmitting the interactive terminal signal to the secure payment chip.

Preferably, the switching instruction is issued from a mobile device. The switching of the active and the passive antennas is achieved by an APP of a mobile device issuing a switching instruction to the MCU of the wearable device.

In the present technical solution, both active and passive coil designs are supported in the same wearable device at the same time, which may be switched for the wearable device by an intelligent terminal issuing a switching instruction. In addition, a firmware running on the main control chip of the wearable device automatically determines to switch from the active antenna to the passive antenna according to the situation of battery level. It can significantly improve the success rate of swiping card in non-contact applications of the wearable device, and prolong the service time of the product's battery, which enhances the user's experience significantly.

The specific implementations described above further explain the purpose, technical solutions and beneficial effects of the invention in details, it should be understood that the above are only specific implementations of the present invention, but not limiting the protecting scope of the invention, any modifications, equivalent replacements, improvements made within the spirit and principle of the invention should be included in the protecting scope of the invention.

What is claimed is:

1. A wearable device, comprising:
   a main control chip, a switching circuit, a secure payment chip, a signal gain chip, an active coil and a passive coil; wherein,
   the main control chip is used for receiving a switching instruction and generating a control signal according to the switching instruction, the control signal being input to the switching circuit;
   the switching circuit is used for generating a switching signal according to the control signal and controlling the wearable device to be in an active coil working state or a passive coil working state;
   the secure payment chip is used for executing a payment operation behavior according to an interactive terminal signal and generating a return signal;
   the signal gain chip is used for amplifying, receiving and transmitting the interactive terminal signal and the return signal when the wearable device is in the active coil working state;
   the active coil is used for transmitting the amplified return signal to an interactive terminal and transmitting the interactive terminal signal to the signal gain chip;
   the passive coil is used for transmitting the return signal to an interactive terminal when in the working state and transmitting the interactive terminal signal to the secure payment chip;
   wherein the active coil and the passive coil are separate from each other.

2. The wearable device of claim 1, wherein the main control chip is also used for generating a control signal according to the battery level of the wearable device, the control signal being input to the switching circuit.

3. The wearable device of claim 1, wherein the switching instruction is issued from a mobile device.

* * * * *